(12) United States Patent
Suzuki et al.

(10) Patent No.: US 7,003,115 B1
(45) Date of Patent: Feb. 21, 2006

(54) COMMUNICATION APPARATUS, COMMUNICATION SYSTEM AND METHOD OF THE SAME

(75) Inventors: Mitsuhiro Suzuki, Chiba (JP); Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/499,562

(22) Filed: Feb. 7, 2000

(30) Foreign Application Priority Data

Feb. 9, 1999 (JP) .................................. 11-031877

(51) Int. Cl.
*H04K 1/00* (2006.01)
*H04N 7/167* (2006.01)

(52) U.S. Cl. ..................... 380/270; 380/200; 380/210
(58) Field of Classification Search ............... 380/270, 380/200, 210
See application file for complete search history.

(56) References Cited

U.S. PATENT DOCUMENTS

| 4,750,213 A | * | 6/1988 | Novak ....................... 455/3.01 |
| 5,557,541 A | | 9/1996 | Schulhof et al. |
| 6,061,056 A | * | 5/2000 | Menard et al. ............. 345/704 |
| 6,118,873 A | * | 9/2000 | Lotspiech et al. .......... 380/277 |
| 6,625,811 B1 | * | 9/2003 | Kaneko ....................... 725/94 |

FOREIGN PATENT DOCUMENTS

| EP | 0 741 468 | 11/1996 |
| EP | 0 804 012 | 10/1997 |

OTHER PUBLICATIONS

JP 10303840, Kaneko, "Multichannel broadcasting system", Nov. 23, 1998.*

* cited by examiner

*Primary Examiner*—Gilberto Barrón, Jr.
*Assistant Examiner*—Grigory Gurshman
(74) *Attorney, Agent, or Firm*—Frommer Lawrence & Haug LLP; William S. Frommer; Thomas F. Presson

(57) ABSTRACT

A communication apparatus capable of reducing the amount of communication with other communication apparatuses is provided, wherein a content signal of a popular program is broadcasted in advance from a broadcast base station to terminals and stored in a memory of each. In a terminal, when a content signal specified by a play instruction signal is stored in the memory, the content signal is read from the memory. On the other hand, when it is not stored in the memory, the terminal requests the specified content signal from the cellular base station via a cellular network and receives the specified content signal.

39 Claims, 8 Drawing Sheets

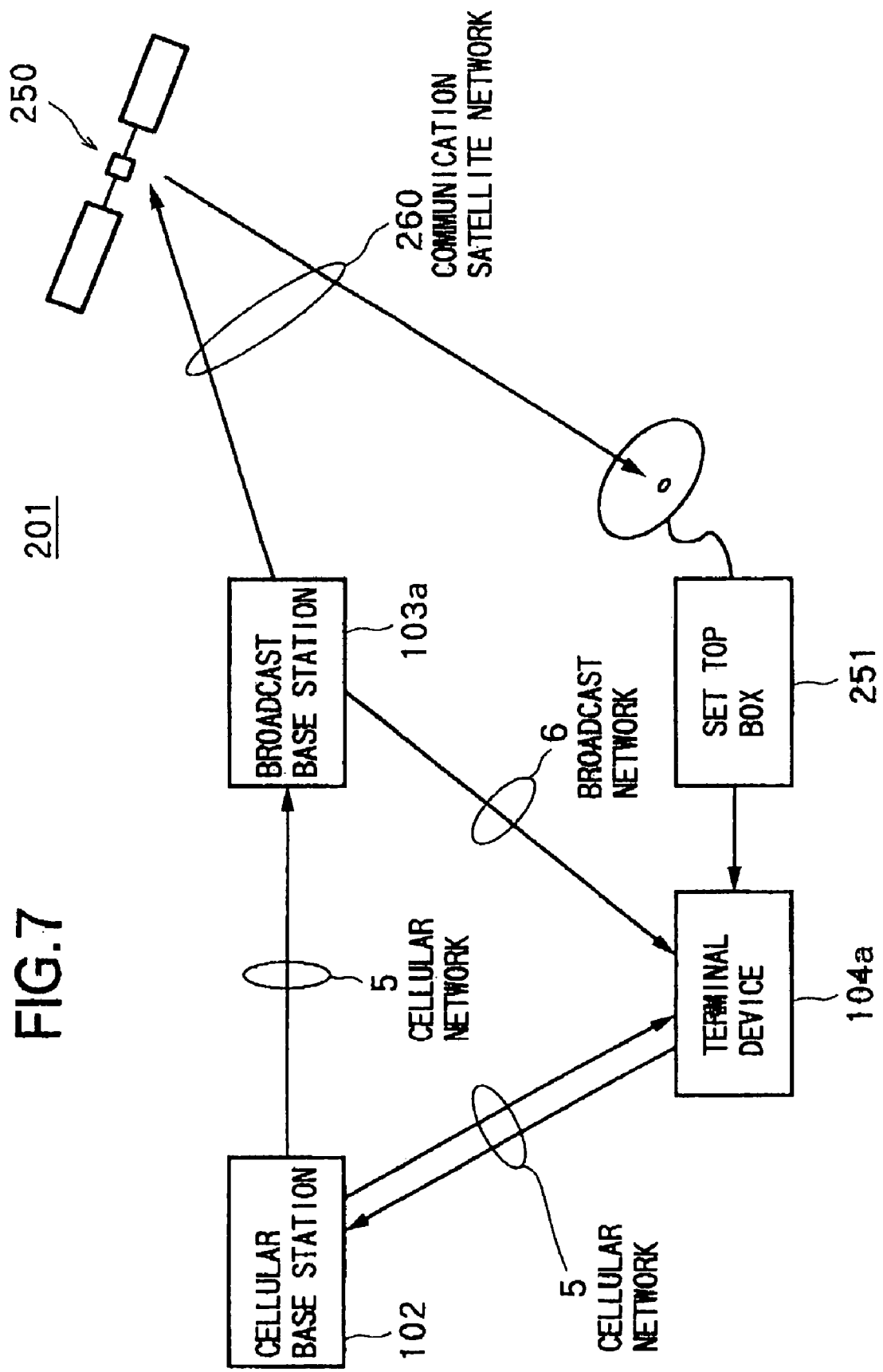

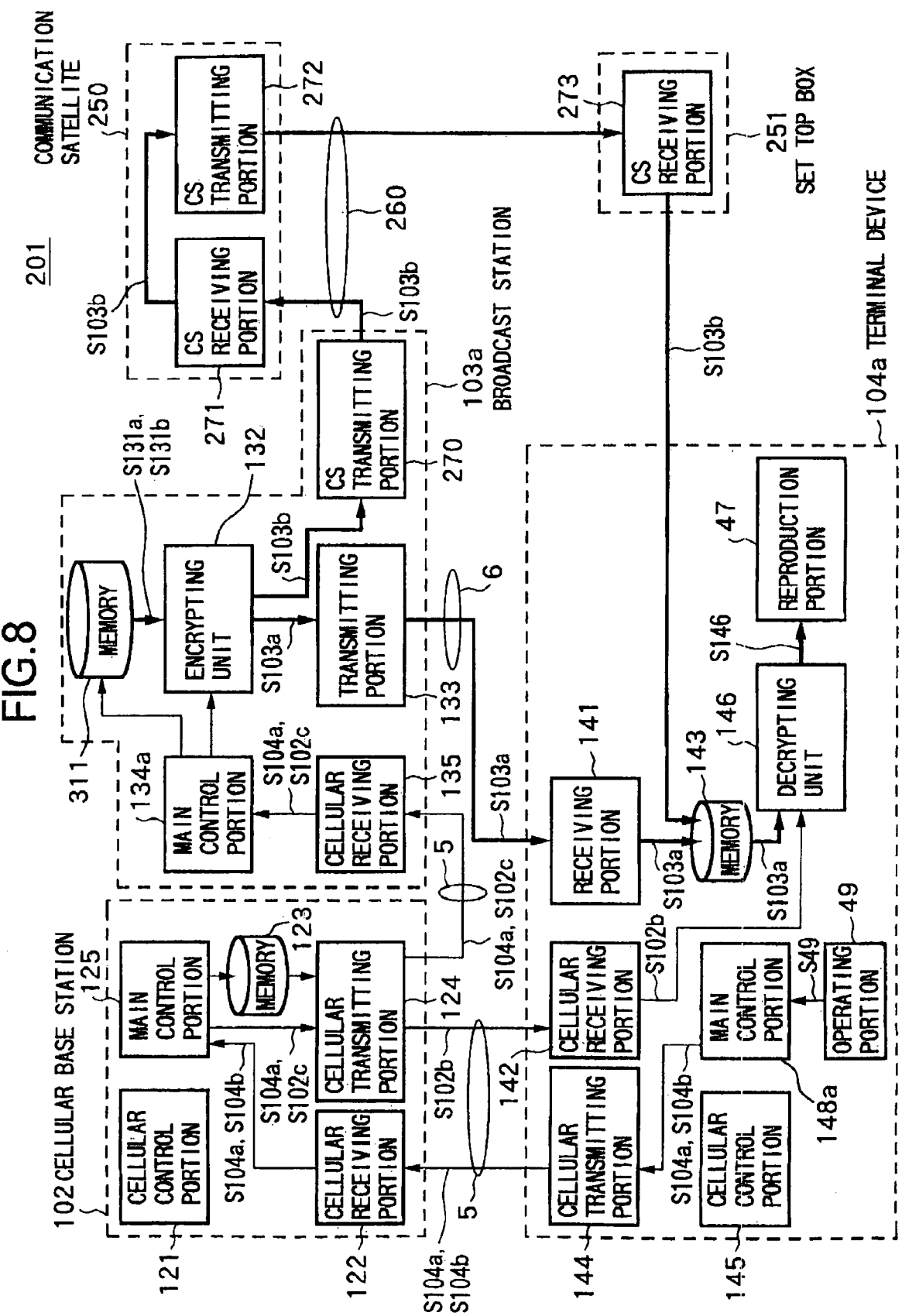

COMMUNICATION APPARATUS, COMMUNICATION SYSTEM AND METHOD OF THE SAME

BACKGROUND OF THE INVENTION

1. Field of the Invention

The present invention relates to a communication apparatus for receiving a content signal, a communication apparatus for transmitting a content signal, a communication system for transmitting and receiving a content signal, and a method for the same.

2. Description of the Related Art

In recent years, along with the development of the Internet, computer, mobile communications, and other technologies, it has become possible for individual users to obtain a video signal, audio signal, or other variety of content signals upon request when and where needed.

In a conventional communication system using the Internet and mobile communications, a specific communication line established by using an ISDN (integrated services digital network), a cellular system using up and down channels, or another communication medium enabling two-way communication is used for transmitting a content request signal from a terminal of a user to a server and for transmitting a content signal in accordance with the content request signal from the server to the terminal which sent the content request signal.

As explained above, in a conventional communication system, a content signal is sent from a server to a terminal of a user under the condition that the server received a content request signal. Further, transmission of the content signal is performed by individually establishing a communication line (assigning a channel) between the server and the terminal which sent the content request signal.

In the above conventional communication system, however, since transmission of a content signal from the server to the terminal is performed by individually establishing a communication line between the terminal which sent the content signal and the server, it becomes difficult to assign communication lines to terminals of all users demanding communication in a time zone where, for example, many users communicate by using their terminals.

While one method would be to increase the number of communication lines, since the communication capacity of a communication medium as a whole is limited, when assigning communication lines to many users, there is a disadvantage that a communication capacity able to be assigned to one user becomes small and the communication time becomes long.

The present invention was made in consideration of the above disadvantages of the prior art and has as its object to provide a communication apparatus for receiving a content signal, a communication system for transmitting a content signal, and a communication system for receiving and transmitting a content signal capable of reducing the volume of communication via individually established communication lines between a server and terminals and a method for the same.

SUMMARY OF THE INVENTION

An object of the present invention is to provide a communication apparatus for receiving a content signal, a communication system for transmitting a content signal, and a communication system for receiving and transmitting a content signal capable of reducing the volume of communication via individually established communication lines between a server and terminals and a method for the same.

To attain the above object, according to a first aspect of the present invention, there is provided a communication apparatus for receiving a content signal and storing the received content signal, comprising: a reception means for receiving a broadcasted content signal; a memory means for storing the broadcasted content signal received by the reception means; a control means for judging whether or not a specified content signal is stored in the memory means and, when it is judged that it is not stored, generating a content request signal for requesting the specified content signal; and a transmission means for transmitting the generated content request signal: and wherein, the reception means also receives a content signal in accordance with the transmitted content request signal.

In the communication apparatus according to the first aspect of the present invention, the broadcasted content signal is stored in the memory means after being received by the reception means.

Then, in a control means, it is judged whether or not a content signal specified by, for example, a user is stored in the memory means, and when judged it is not stored, a content request signal for requesting the specified content signal is generated.

Then, the content request signal is transmitted from a transmission means.

Then, a content signal in accordance with the content request signal is received by the reception means.

Namely, the communication apparatus according to the first aspect of the present invention does not output a content request signal and receive a content signal unconditionally when a content signal is specified. The specified content signal stored in the memory means is used when the specified content signal has already been broadcasted and stored in the memory means.

At this time, since the reception means of the communication apparatus can receive a content signal without individually establishing a communication line with a server of the content signal, by for example the server broadcasting a popular content signal, it becomes unnecessary for many communication apparatuses to individually establish communication lines with the server for receiving the popular content signal. As a result, the volume of the communication using individual communication lines can be largely reduced.

According to a second aspect of the present invention, there is provided a method of communication for receiving a content signal, comprising the steps of: a broad cast reception process for receiving a broadcasted content signal; storing the broadcasted content signal received by the broadcast reception process; a control process for judging whether or not a specified content signal is stored and generating a content request signal for requesting the specified content signal when it is judged that it is not stored; a transmission process for transmitting the generated content request signal; and an individual reception process for further receiving a content signal response to the transmitted content request signal.

According to a third aspect of the present invention, there is provided a communication apparatus capable of communicating with other plurality of communication apparatuses, comprising: a reception means for receiving a content request signal form the other communication apparatuses; a memory means for storing a content signal; a transmission means for broadcasting a content signal to the plurality of communication apparatuses and transmitting a content signal to the other communication apparatuses which transmitted the content request signal; and a control means for reading a predetermined content signal from the memory means, making the read specified content signal be broadcasted from the transmission means to the plurality of other transmission apparatuses, reading a content signal requested by the content request signal from the memory means when the reception means receives the content request signal, and making the read content signal be transmitted from the transmission means to the other communication apparatuses which transmitted the content request signal.

According to a fourth aspect of the present invention, there is provided a communication apparatus capable of communicating with a plurality of other communication apparatuses, comprising: a reception means for receiving a content request signal from the other communication apparatuses; a transmission means for transmitting a content signal to the other communication apparatuses which transmitted the content request signal; and a control means for generating a control signal to make a content signal requested much be broadcasted by a broadcast device based on the content request signal and transmitting to a broadcast device.

According to a fifth aspect of the present invention, there is provided a method of communication for transmitting a content signal to a plurality of other communication apparatuses, comprising the steps of: a reception process for receiving a content request signal from the other communication apparatus; a transmission process for transmitting a content signal to the other communication apparatuses which transmitted the content request signal; and a control process for generating a control signal to make a content signal requested much be broadcasted by a broadcast device based on the content request signal and transmitting to a broadcast device.

According to a sixth aspect of the present invention, there is provided a communication apparatus capable of communicating with a plurality of other communication apparatuses according to a fourth aspect of the present invention, comprising: a reception means for receiving from a communication station a broadcast request signal for requesting to broadcast a content signal requested much by other communication apparatuses generated based on a content request signal for requesting a content from the plurality of other communication apparatuses to the communication station; and a broadcast means for broadcasting a content signal based on the broadcast request signal to the plurality of other communication apparatuses.

According to a seventh aspect of the present invention, there is provided a method of communication for broadcasting a content signal to a plurality of other communication apparatuses, comprising the steps of: a reception process for receiving from a communication station a broadcast request signal for requesting to broadcast a content signal requested much by other communication apparatuses generated based on a content request signal for requesting a content from the plurality of other communication apparatuses to the communication station; and a broadcast process for broadcasting a content signal based on the broadcast request signal to the plurality of other communication apparatuses.

According to the eighth invention there is provided a communication system having a first communication apparatus for providing a content signal and one or more second communication apparatuses for being provided with the content signal, wherein: the first communication apparatus, comprising: a first reception means for receiving a content request signal from the second communication apparatus; a first memory means for storing a content signal; a first transmission means for broadcasting a content signal to the plurality of second communication apparatuses and transmitting a content signal to the second communication apparatus which transmitted the content request signal; a first control means for reading a predetermined content signal from the memory means, making the read predetermined content signal be broadcasted from the transmission means to the plurality of second communication apparatuses, reading a content signal requested by the content request signal from the memory means when the reception means receives the content request signal, and making the read content signal be transmitted from the transmission means to the second communication apparatus which transmitted the content request signal; and the second communication apparatus comprises: a second reception means for receiving a broadcasted content signal and also a content signal in accordance with the content request signal; a second memory means for storing the broadcasted content signal received by the reception means; a second control means for judging whether or not a specified content signal is stored in the memory means and, when it is judged that it is not stored, generating a content request signal for requesting the specified content signal; and a second transmission means for transmitting the generated content request signal.

According to a ninth aspect of the present invention, there is provided a method of communication performed between a first communication apparatus for providing a content signal and one or more second communication apparatuses for being provided with the content signal, comprising the steps of: broadcasting a predetermined content signal from the first communication apparatus to the one or more second communication apparatuses; storing the broadcasted predetermined content signal in each the second communication apparatus; judging whether or not a specified content signal is stored in a the second communication apparatus and transmitting the content request signal for requesting the specified content signal from a second communication apparatus to the first communication apparatus when it is judged that it is not stored; and transmitting a content signal in accordance with the content request signal from the first communication apparatus to the second communication apparatus which transmitted the content request signal.

According to a tenth aspect of the present invention, there is provided a communication apparatus, comprising: a first reception means for receiving a broadcasted content signal; a memory means for storing said broadcasted content signal received by said first reception means; a control means for judging whether or not a specified content signal is stored in said memory means and, when it is judged that it is not stored, generating a content request signal for requesting said specified content signal; a transmission means for transmitting said generated content request signal; and a second reception means for receiving a content signal in accordance with said transmitted content request signal by a lower bit rate compared with that of said first reception means.

BRIEF DESCRIPTION OF THE DRAWINGS

These and other objects and features of the present invention will become clearer from the following description of the preferred embodiments given with reference to the accompanying drawings, in which:

FIG. 7 is a view of the configuration of a communication system of a third embodiment of the present invention; and FIG. 8 is a view of the internal configurations of the blocks shown in FIG. 7.

DESCRIPTION OF THE PREFERRED EMBODIMENTS

Below, preferred embodiments will be described with reference to the accompanying drawings.

Communication systems according to embodiments of the present invention will be explained below.

First Embodiment

Figure 1:
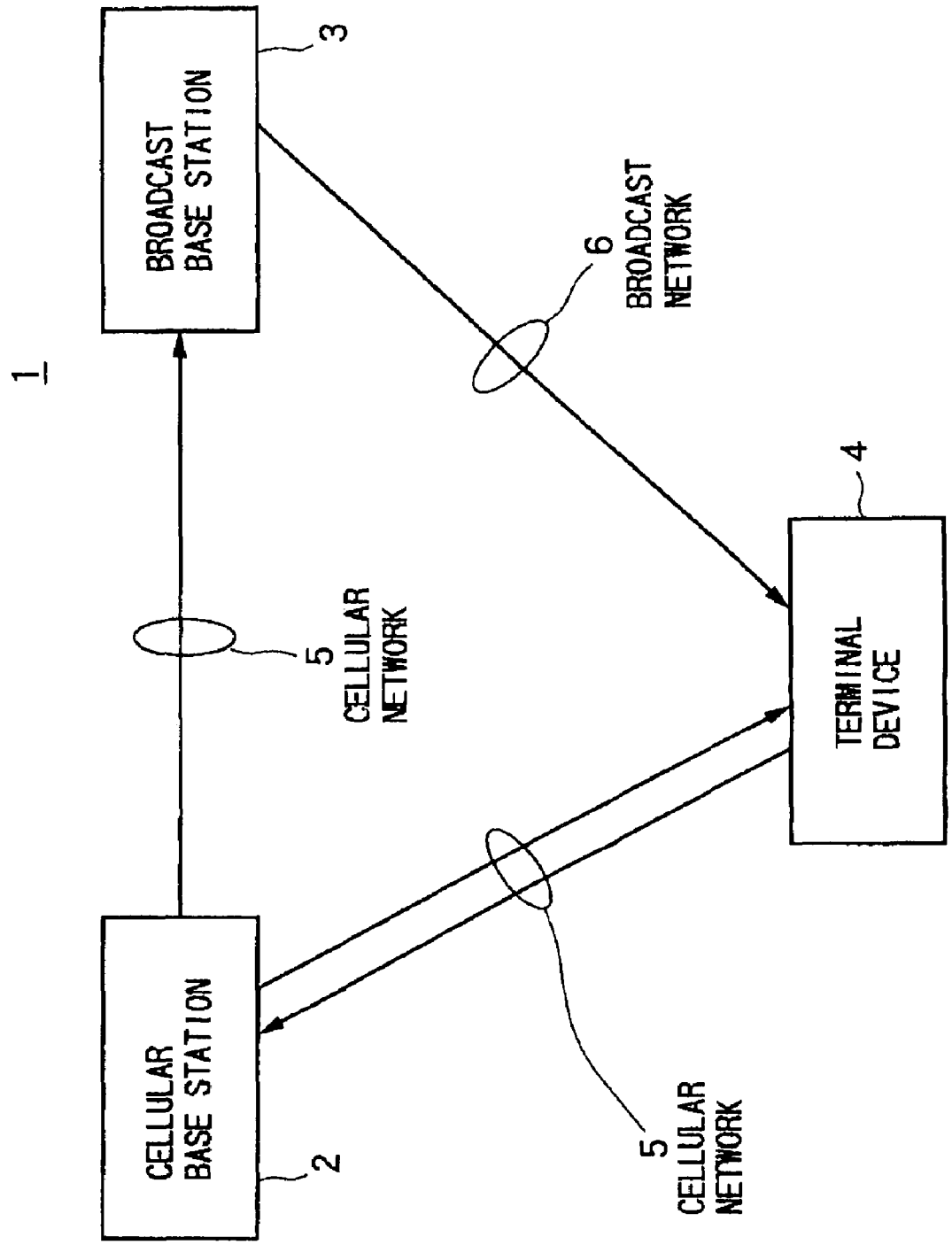
FIG. 1 is a view of the configuration of a communication system according to a first embodiment of the present invention.
Figure 2:
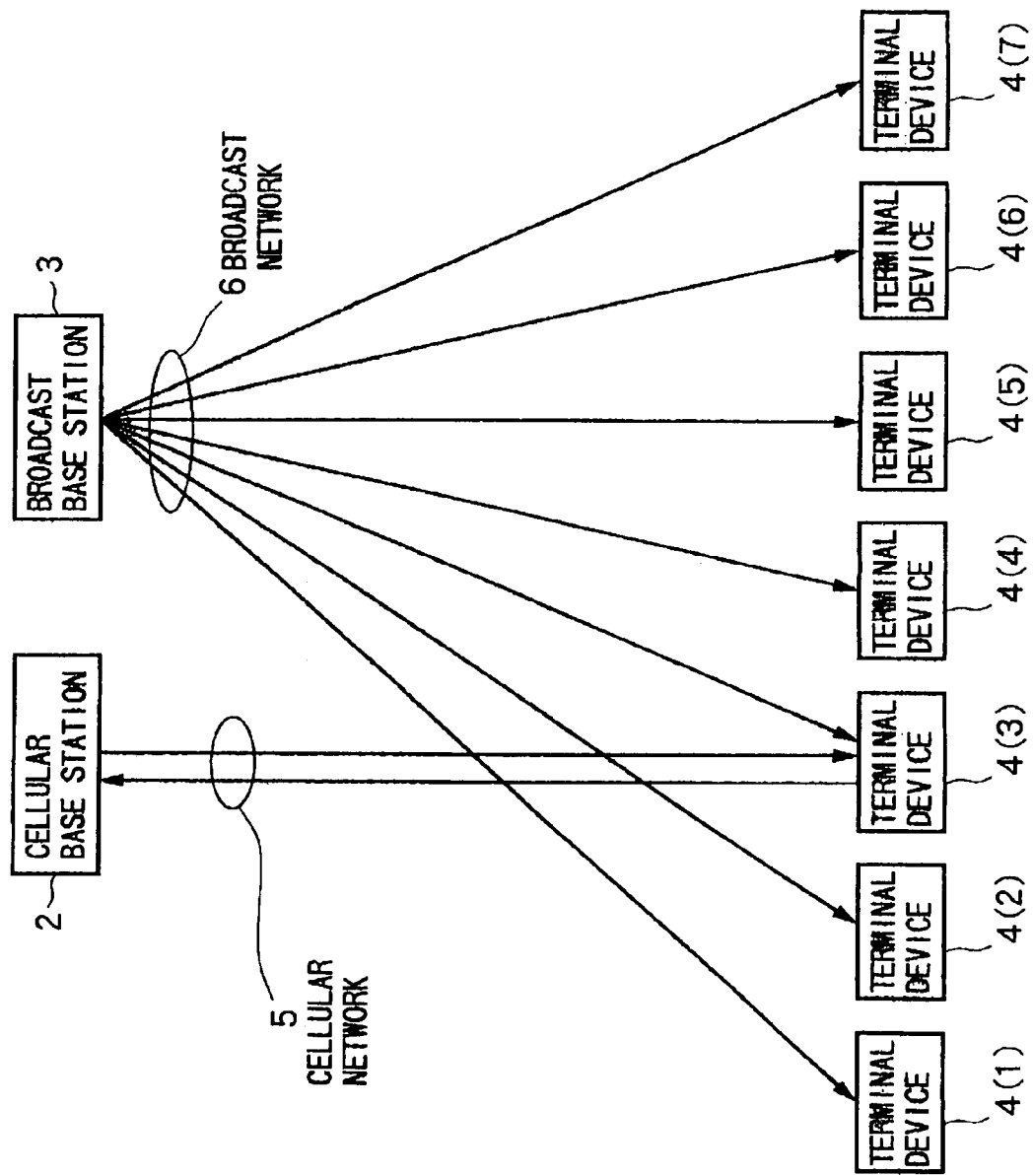
FIG. 2 is a view for explaining an example of the numbers of base stations and terminals shown in FIG. 1.
Figure 3:
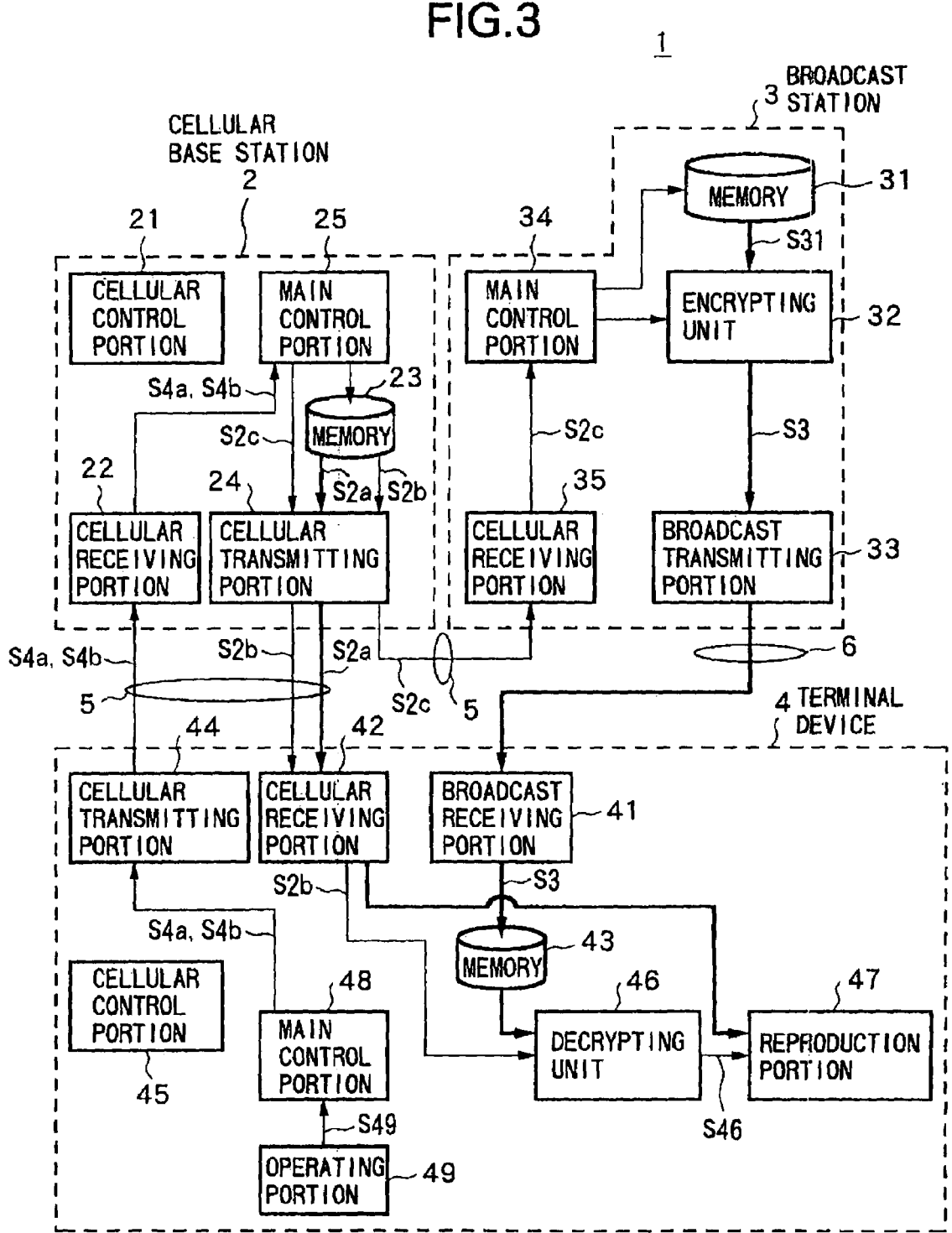
FIG. 3 is a view of the internal configurations of the blocks shown in FIG. 1.

FIG. 1 is a view of the configuration of a communication system 1 of the present embodiment, FIG. 2 is a view for explaining an example of the numbers of base stations and terminals shown in FIG. 1, and FIG. 3 is a view of the internal configurations of the blocks shown in FIG. 1.

As shown in FIG. 1, the communication system 1 comprises a cellular base station 2, a broadcast base station 3, and a terminal 4.

Here, bidirectional cellular communication using a cellular network 5 is performed between the cellular base station 2, the broadcast base station 3, and the terminal 4. Also, broadcasting using a broadcast network 6 is performed from the broadcast station 3 to the terminal 4.

Note that there may be any number of cellular base stations 2, broadcast base stations 3, and terminals 4. Normally, as shown in FIG. 2, a plurality of terminals 4(1) to 4(7) are connected to one cellular base station 2 and broadcast base station 3.

Also, in FIG. 2, the terminals 4(1) to 4(7) have the same configuration with that of the later explained terminal 4.

[Cellular Network 5]

In the cellular network 5, for example, a frequency bandwidth of 800 MHZ is used, a service area is comprised by a plurality of cells, the wireless access method is the TDD (time division duplex) mode, and the modulation format is QPSK (quadrature phase shift keying).

Here, in communication via the cellular network 5, bidirectional communication is performed between communication nodes. Call control for assigning a channel in accordance with an occurrence of a call between the communication nodes (individually connecting the communication lines), position registration control for registering a position of a communication node when the communication node moves geographically, cell switching control during communication enabling transition of cells during communication, and end conversation control for disconnecting the channel in accordance with an end of the call are performed.

Note that in the present embodiment, the cellular base station 2, the broadcast base station 3, and the terminal 4 correspond to communication nodes.

Also, in the example shown in FIG. 2, a channel is assigned only between the cellular base station 2 and the terminal 4(3) via the cellular network 5.

[Broadcast Network 6]

In the broadcast network 6, for example, a frequency bandwidth of 2 to 5 MHZ is used, a service area is comprised by a plurality of cells, and the modulation format is QPSK (quadrature phase shift keying).

In communication via the broadcast network 6, one-way communication only from the broadcast base station 3 to the terminal 4 is performed. Namely, broadcasting of an encrypted content signal S3 from the broadcast base station 3 to the terminal 4 is performed.

Further, at this time, an individual channel is not assigned between the broadcast base station 3 and the terminal 4. For example as shown in FIG. 2, the content signal broadcasted by the broadcast base station 3 is received by all terminals 4(1) to 4(7).

Note that as the broadcast network 6, for example, digital television broadcasting of a ground wave having a higher bit rate compared with the cellular network 5 is used.

Also, in the present embodiment, the content signal may be any signal such as a video signal, an audio signal, or a computer program.

The components shown in FIG. 1 will be explained below.

[Cellular Base Station 2]

As shown in FIG. 3, the cellular base station 2 comprises a cellular control unit 21, a cellular receiving unit 22, a memory 23, a cellular transmitting unit 24, and a main control unit.

The cellular control unit 21 controls the overall cellular communication by the cellular receiving unit 22 and the cellular transmitting unit 24. Specifically, the cellular control unit 21 performs wireless management such as zone (cell) selection and wireless line setting, mobile management such as position registration and authentication, and call control such as signal transmission and signal reception.

The cellular receiving unit 22 outputs a content request signal S4$a$ and a key data request signal S4$b$ received from the terminal 4 via the cellular network 5 to the main control unit 25 under the control of the cellular control unit 21.

The memory 23 stores a content signal to be transmitted to the terminal 4, data for authentication of a subscriber, and key data via the cellular network 5.

The cellular transmitting unit 24 transmits a content signal S2$a$ and a key data signal S2$b$ read from the memory 23 under the control of the main control unit 25 via the cellular network 5 under the control of the cellular control unit 21. Namely, the cellular transmitting unit 24 individually connects a communication line with the terminal 4 which sent the content request signal S4$a$ and transmits the content signal S2$a$ and the key data signal S2$b$ only to the terminal 4.

Further, the cellular transmitting unit 24 transmits a broadcast instruction signal S2$c$ input from the main control unit 25 to the broadcast base station 3 via the cellular network 5.

The main control unit 25 controls the overall processing of the cellular base station 2.

Specifically, when a content request signal S4$a$ is input from the cellular receiving unit 22, the main control unit 25 performs an authentication procedure to judge if the user is a subscriber or not based on data for identifying the user included in the content request signal S4$a$, and when it judges it to be a subscriber, reads the content signal S2$a$ requested by the content request signal S4$a$ from the memory 23 and outputs it to the cellular transmitting unit 24.

Also, when the key data request signal S4$b$ is input from the cellular receiving unit 22, the main control unit 25 performs an authentication procedure to judge if the user is a subscriber or not based on data for identifying the user included in the key data request signal S4$b$, and when it judges it to be a subscriber, reads the key data S2$b$ requested by the key data request signal S4$b$ from the memory 23 and outputs it to the cellular transmitting unit 24. The main control unit 25 performs charging processing etc. in accordance with need, for example, after outputting the key data S2$b$.

Note that in the charging processing, for example, bidirectional communication is performed with the terminal 4 by using the cellular network 5 for a procedure of questions and answers on payment methods etc.

Further, the main control unit 25 specifies a frequently requested content signal, that is, a popular content signal, based on the content request signal S4$a$ and outputs a broadcast instruction signal S2$c$ for instructing broadcast of the specified content signal to the cellular transmitting unit 24. The broadcast instruction signal S2$c$ is transmitted from the cellular transmitting unit 24 to the broadcast base station 3 via the cellular network 5.

[Broadcast Base Station 3]

As shown in FIG. 3, the broadcast base station 3 comprises a memory 31, an encrypting unit 32, a broadcast transmitting unit 33, a main control unit 34, and a cellular receiving unit 35.

The memory 31 stores a content signal to be broadcasted via the broadcast network 6.

The encrypting unit 32 encrypts the content signal S31 read from the memory 31 and outputs the encrypted content signal S3 to the broadcast transmitting unit 33 under the control of the main control unit 34.

The broadcast transmitting unit 33 transmits the encrypted content signal S3 input from the encrypting unit 32 to terminals via the broadcast network 6 under the control of the main control unit 34. Namely, the broadcast transmitting unit 33 transmits the content signal S3 to an unspecified large number of terminals 4.

The cellular receiving unit 35 outputs the broadcast instruction signal S2$c$ received from the cellular base station 2 to the main control unit 34 via the cellular network 5.

The main control unit 34 controls the overall processing of the broadcast base station 3.

The main control unit 34 reads a content signal of a program for which it predicts the cellular base station 2 will receive a content request signal S4$a$ from a large number of subscribers and outputs it to the encrypting unit 32 as a content signal S31.

Further, when the broadcast instruction signal S2$c$ is input from the cellular base station 2, the main control unit 34 reads the content signal indicated by the broadcast instruction signal S2$c$ from the memory 31 in advance and outputs it to the encrypting unit 32 as a content signal S31.

[Terminal 4]

As shown in FIG. 3, the terminal 4 comprises a broadcast receiving unit 41, a cellular receiving unit 42, a memory 43, a cellular transmitting unit 44, a cellular control unit 45, a decrypting unit 46, a reproduction unit 47, a main control unit 48, and an operation unit 49.

The broadcast receiving unit 41 outputs the content signal S3 received from the broadcast base station 3 to the memory 43 via the broadcast network 6 under the control of the main control unit 48.

The cellular receiving unit 42 outputs an nondecrypted content signal S2$a$ received from the cellular base station 2 through an individually established communication line via the cellular network 5 to the decrypting unit 46 under the control of the main control unit 48.

Also, the cellular receiving unit 42 outputs the key data S2$b$ received from the cellular base station 2 through an individually established communication line via the cellular network 5 to the recoding unit 46 under the control of the main control unit 48.

The memory 43 stores the encrypted content signal S3 input from the broadcast receiving unit 41.

The cellular transmitting unit 44 transmits the content request signal S4$a$ and the key data request signal S4$b$ input from the main control unit 48 to the cellular base station 2 via the cellular network 5.

The cellular control unit 45 controls the overall cellular communication by the cellular receiving unit 42 and the cellular transmitting unit 44. Specifically, the cellular control unit 45 performs wireless management such as zone selection and wireless line setting, mobile management such as position registration and authentication, and call control such as signal transmission and signal reception in the same way as in the above cellular control unit 21.

The decrypting unit 46 decrypts the content signal S43 read from the memory 43 by using the key data S2$b$ input from the cellular receiving unit 42 to generate a content signal S46 and outputs the content signal S46 to the reproduction unit 47.

The reproduction unit 47 selectively receives as input the content signal S46 from the memory 43 and the content signal S2$a$ from the cellular receiving unit 42 and outputs a video or audio in accordance with the input content signal respectively to a display and a speaker.

The operation unit 49 has at least one operation means such as a keyboard, mouse, and buttons and outputs a content play instruction signal S49 specifying the content the user wishes to have played to the main control unit 48 in accordance with a user's operation.

The main control unit 48 controls the overall processing of the terminal 4.

Figure 4:
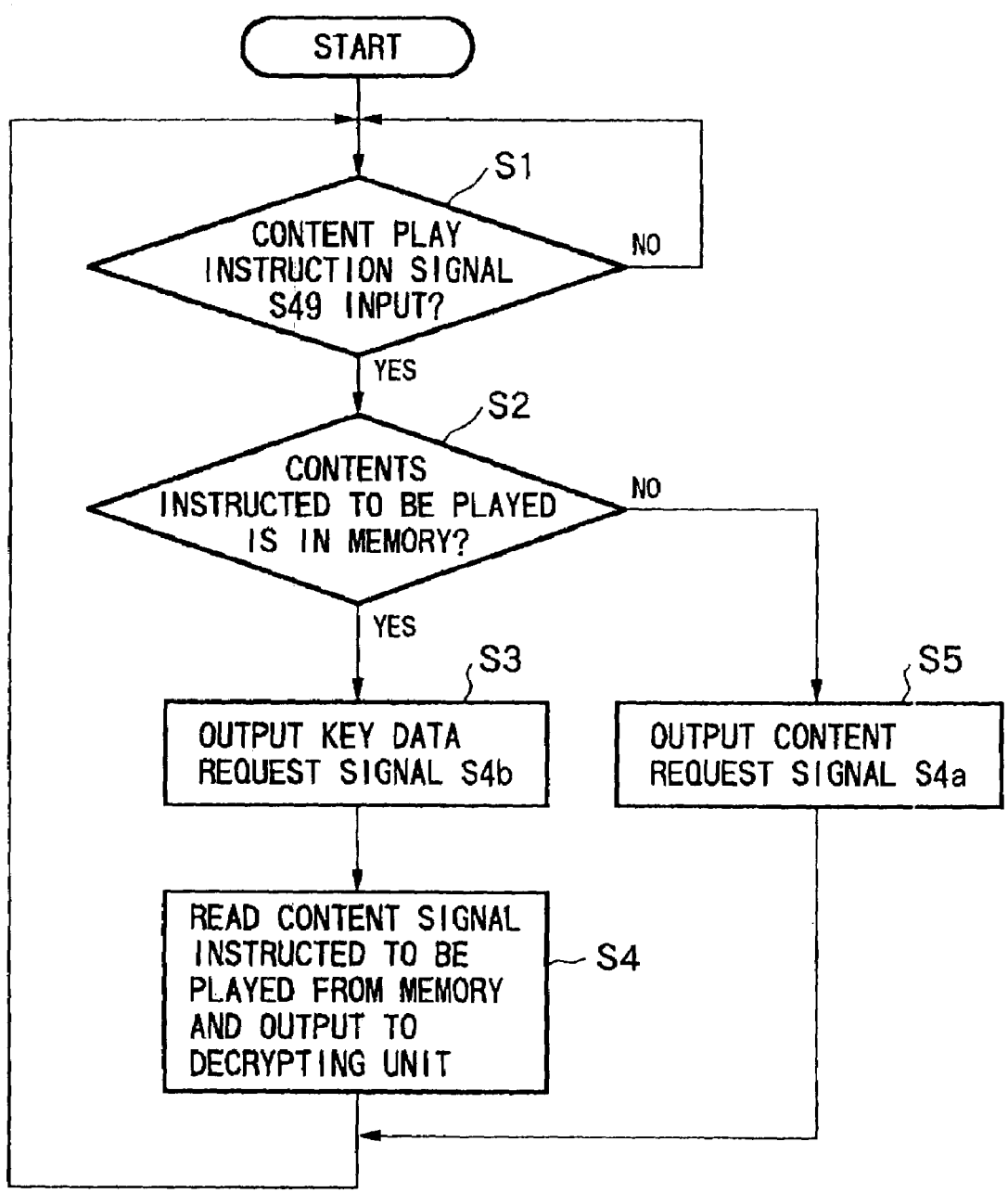
FIG. 4 is a flow chart for explaining processing in accordance with a content play instruction signal in a main control unit shown in FIG. 1.

FIG. 4 is a flow chart for explaining the processing carried out in accordance with the content play instruction signal in the main control unit 48.

Step S1: The main control unit 48 judges whether or not the content play instruction signal S49 has been input from the operation unit 49 and, when judging that it is input, executes the processing of Step S2 is executed, while when otherwise, repeats the processing of Step S1.

Step S2: The main control unit 48 judges whether or not the content signal specified to be played by the content play instruction signal S49 input at Step S1 is stored in the memory 43 by referring to, for example, a management table. Namely, it judges whether or not the content signal instructed to be played has already been broadcasted from the broadcast base station 3 via the broadcast network 6.

The main control unit 48 executes the processing of Step S3 when it judges that the content signal instructed to be played is stored in the memory 43 while, when otherwise, executes the processing of Step S4.

Step S3: The main control unit 48 outputs the key data request signal S4$b$ for requesting key data for decrypting the content signal (an encrypted content signal stored in the memory 43) instructed to be played by the content play instruction signal S49 to the cellular transmitting unit 44.

At this time, the key data request signal S4$b$ includes data for specifying the content signal to be decrypted and data of ID and a PIN code for specifying the subscriber etc.

Step S4: The main control unit 48 reads the content signal instructed to be played from the memory 43 and outputs it to the decrypting unit 46.

Step S5: The main control unit 48 outputs the content request signal S4a for requesting the content signal instructed to be played by the content play instruction signal S49 to the cellular transmitting unit 44.

Below, the overall operation of the communication system 1 shown in FIG. 1 will be explained.

First, the broadcast base station 3 reads from the memory 31 in advance a content signal S31, for which it is predicted that many users will wish to view and outputs it to the encrypting unit 32 under the control of the main control unit 34.

Then, it encrypts the content signal S31 in the encrypting unit 32 to generate a content signal S3 which it broadcasts to a large number of terminals 4 via the broadcast network 6.

Then, the content signal S3 is received by the broadcast receiving unit 41 of the terminal and stored in the memory 43.

Next, the operations explained below are carried out between the cellular base station 2 and a terminal 4 based on a content play instruction signal S49 generated in accordance with operation of the operation unit 49 by the user.

Below, the operation carried out between the cellular base station 2 and a terminal 4 will be separately explained for cases of whether or not the content signal instructed to be played by the content play instruction signal S49 is stored in the memory 43.

[First Example of Operation]

In the first example of operation, the operation when the content signal instructed to be played by the content play instruction signal S49 is stored in the memory 43 will be explained.

The operation unit 49 of the terminal 4 is operated by a user and the content play instruction signal S49 specifying the content the user wishes to view (be played) is output from the operation unit 49 to the main control unit 48.

Then, in the main control unit 48, the content signal of the content specified by the content play instruction signal S49 is judged to be stored in the memory 43 (Steps S1 and S2 shown in FIG. 4).

Then, the key data request signal S4b to request key data for decrypting the content signal instructed to be played by the content play instruction signal S49 is transmitted from the main control unit 48 to the cellular transmitting unit 44 (Step S3 shown in FIG. 4), and the key data request signal S4b is received by the cellular receiving unit 22 of the cellular base station 2 via the cellular network 5.

The key data request signal S4b received by the cellular receiving unit 22 is output to the main control unit 25, the user authentication procedure is carried out by the main control unit 25, and when it is judged that the user is a subscriber, the key data S2b specified by the key data request signal S4b is read from the memory 23 to the cellular transmitting unit 24.

Then, the key data S2b is transmitted from the cellular transmitting unit 24 to the terminal 4 via the cellular network 5 and received by the cellular receiving unit 42 of the terminal 4.

The key data S2b received by the cellular receiving unit 42 is output to the decrypting unit 46.

Further, the content signal of the content specified by the content play instruction signal S49 is read from the memory 43 and output to the decrypting unit 46 (Step S4 shown in FIG. 4).

Then, in the decrypting unit 46, the content signal read from the memory 43 is decrypted by using the key data S2b and the decrypted content signal S46 is output to the reproduction unit 47.

Then, in the reproduction unit 47, an audio and video in accordance with the content signal S46 is played and output.

[Second Example of Operation]

The operation when a content signal instructed to be played by a content play instruction signal S49 is not stored in the memory 46 will be explained next.

The operation unit 49 of the terminal 4 is operated by a user and a content play instruction signal S49 specifying the contents the user wishes to view (be played) is output from the operation unit 49 to the main control unit 48.

Then, in the main control unit 48, it is judged that the content signal instructed to be played by the content play instruction signal S49 is not stored in the memory 43 (Steps S1 and S2 shown in FIG. 4).

Then, a content request signal S4a to request for the content signal instructed to be played by the content play instruction signal S49 is transmitted from the main control unit 48 to the cellular transmitting unit 44 (Step S5 shown in FIG. 4), and the content request signal S4a is received by the cellular receiving unit 22 of the cellular base station 2 via the cellular network 5.

The content request signal S4a received by the cellular receiving unit 22 is output to the main control unit 25 and subjected to the user authentication procedure by the main control unit 25. When it is judged that the user is a subscriber, the content signal S2a requested by the content request signal S4a is read from the memory 23 to the cellular transmitting unit 24.

Then, the content signal S2a is transmitted from the cellular transmitting unit 24 to the terminal 4 via the cellular network 5 and received by the cellular receiving unit 42 of the terminal 4.

The content signal S2a received by the cellular receiving unit 42 is output to the reproduction unit 47.

In the reproduction unit 47, audio and video in accordance with the content signal S2a is played and output.

As explained above, according to the communication system 1, for example, a content signal for which it is predicted that there will be demand from many subscribers is encrypted, broadcasted in advance from the broadcast base station 3 to unspecified large number of terminals 4, and stored in the memory 43 of each terminal.

Accordingly, in a terminal 4, when a content signal instructed to be played by the operation of the operation unit 49 by the user has already been broadcasted and stored in the memory 43, it is sufficient to read the content signal from the memory 43. It becomes unnecessary to transmit the content signal from the cellular base station 2 to the terminal 4 or to establish a bidirectional connection (assign a channel) between the cellular base station 2 and the terminal 4 via the cellular network 5.

As a result, according to the communication system 1, the number of individually established communication lines can be largely reduced, and it is possible to effectively prevent the state of an insufficient number of the limited channels provided by the cellular network (traffic).

Further, since traffic can be suppressed in this way, the amount of communication over each channel can be made larger and the amount of data able to be transmitted and received in a unit time in communication using the channels can be made larger in bidirectional communication via the cellular network 5.

Also, according to the communication system 1, when playing a content signal stored in the memory 43 in the terminal 4, the time from outputting the content play instruction signal S49 until playing the content signal can be made shorter comparing with the case of receiving the content signal S2a from the cellular base station 2 based on a content request signal S4a.

Further, in the communication system 1, the content signal S3 broadcasted from the broadcast base station 3 to the terminal 4 is encrypted. When playing the content signal S3 in the terminal 4, bidirectional communication is performed between the cellular base station 2 and the terminal 4 via the cellular network 5, the key data S2b is received through a predetermined procedure of authentication and charging, and the content signal S3 is decrypted by using the key data S2b. Therefore, the procedure of authentication of subscribers and charging along with the usage of the content signal can be appropriately carried out and unauthorized usage of the content signal can be prevented.

Further, in the communication system 1, since the content signal S3 is transmitted by using a digital television broadcast using a ground wave, a large volume content signal S3 can be transmitted at a high speed.

In the communication system 1, the cellular base station 2 has the same configuration as existing cellular base stations so the latter can be used as they are.

Modification of First Embodiment

For example, in the first embodiment, it is judged in the main control unit 48 shown in FIG. 3 whether or not the content signals S3 and S2a received by the broadcast receiving unit 41 and the cellular receiving unit 42 include uncorrectable error. When there is uncorrectable error, a re-transmit instruction signal for instructing re-transmission of the content signals S3a and S2a including the unit where the uncorrectable error exists may be transmitted to the cellular base station 2 and the broadcast base station 3. In this case, the re-transmit instruction signal is sent from the terminal 4 to the broadcast base station 3 via the cellular base station 2.

Also, for example, when there are a plurality of terminals 4(1) to 4(7) as shown in FIG. 2, each of the terminals 4(1) to 4(7) may decide in advance the received content signal S3 to store in the memory 43 and thereby store only the decided content signal S3 in the memory 43. By doing so, the capacity of the memory 43 can be effectively used.

Further, in the first embodiment, an example was explained where a content signal S2a which is not encrypted is transmitted from the cellular base station 2 to the terminal 4 via the cellular network 5, however, an encrypted content signal S2a may be transmitted as well.

In this case, predetermined key data is transmitted from the cellular base station 2 to the terminal 4 via the cellular network 5.

Second Embodiment

In the above first embodiment, an example was explained where the transmission of the content signal 2a in accordance with the content request signal S4a was performed by using the cellular network 5 and where the broadcast of the content signal S3 was performed by using the broadcast network 6. Namely, a case of using channels of different frequency bandwidth between the content signal 2a and the content signal S3 was explained as an example.

In the present embodiment, a case will be explained where transmission of a content signal in accordance with a content request signal and broadcast of a content signal predicted to be popular are performed by using the same channel.

Figure 5:
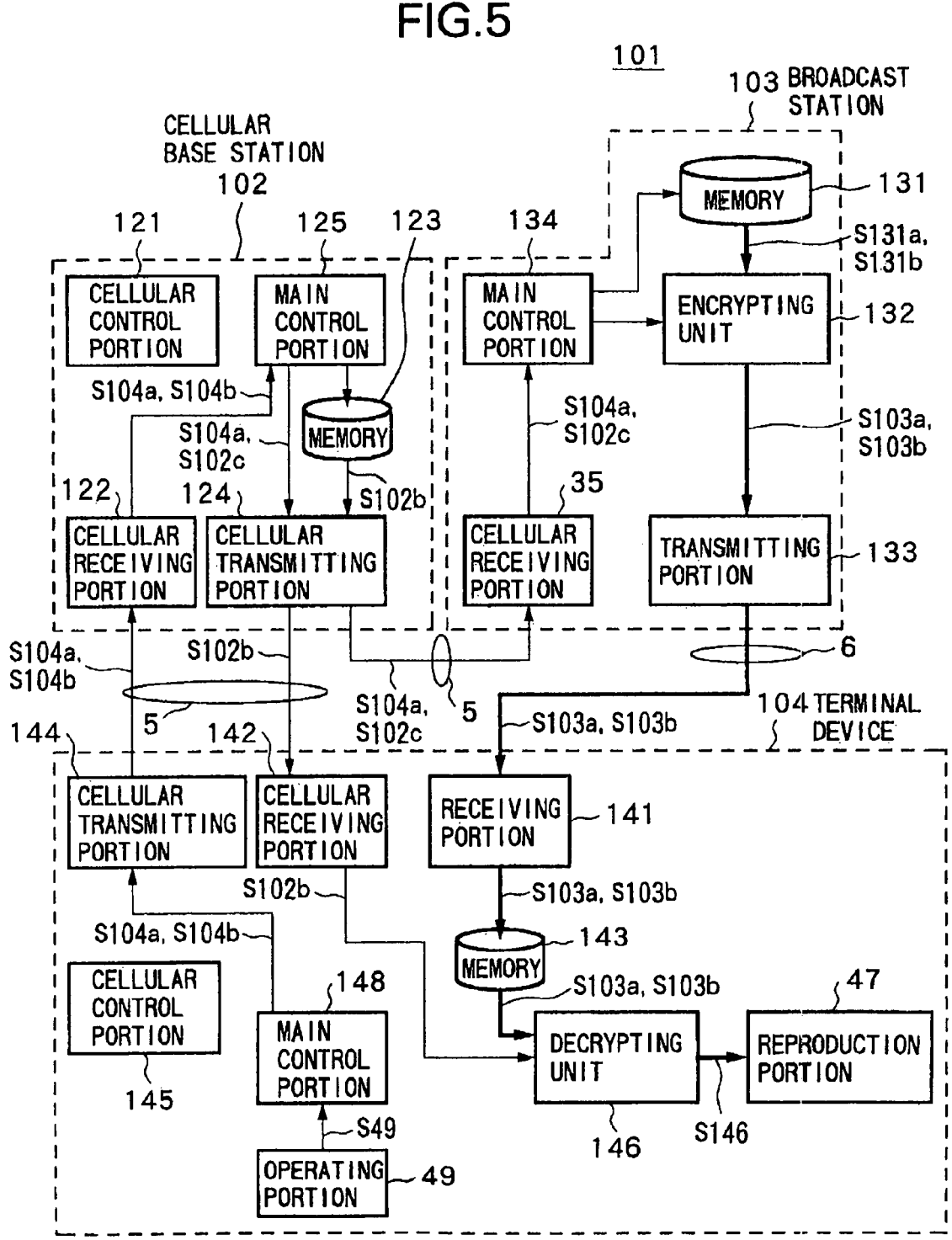
FIG. 5 is a view of the configuration of a communication system of a second embodiment of the present invention.

FIG. 5 is a view of the configuration of a communication system 101 of the present embodiment.

As shown in FIG. 5, the communication system 101 comprises a cellular base station 102, a broadcast base station 103, and a terminal 104.

Here, bidirectional cellular communication using the cellular network 5 is performed among the cellular base station 102, broadcast base station 103, and terminal 104. Also, the broadcast from the broadcast base station 103 to the terminal 104 is performed by using the broadcast network 6.

Note that, while not illustrated in FIG. 5, there may be any number of cellular base stations 102, broadcast base stations 103, and terminals 104. Normally a plurality of terminals 104 are provided for one cellular base station 102 and broadcast base station 103.

Further, the cellular network 5 and broadcast network 6 are the same as those shown in FIG. 1 in the above first embodiment.

The components shown in FIG. 5 will be explained in detail below.

[Cellular Base Station 102]

As shown in FIG. 5, the cellular base station 102 comprises a cellular control unit 121, cellular receiving unit 122, memory 123, cellular transmitting unit 124, and main control unit 125.

The cellular control unit 121 controls the overall cellular communication by the cellular receiving unit 122 and the cellular transmitting unit 124. Specifically, the cellular control unit 121 performs wireless management such as zone selection and wireless line setting, mobile management such as position registration and authentication, and call control such as signal transmission and signal reception.

The cellular receiving unit 122 outputs the content request signal S104a and a key data request signal S104b received from the terminal 104 via the cellular network 5 to the main control unit 125 under the control of the cellular control unit 121.

The memory 123 stores data for performing subscriber authentication and key data.

The cellular transmitting unit 124 transmits the key data signal S102b read from the memory 123 under the control of the main control unit 125 to the terminal 104 via the cellular network 5 under the control of the cellular control unit 121.

Also, the cellular transmitting unit 124 transmits the content request signal S104a and broadcast instruction signal S102c input from the main control unit 125 to the broadcast base station 103 via the cellular network 5.

The main control unit 125 controls the overall processing of the cellular base station 102.

Specifically, when the content request signal S104a is input from the cellular receiving unit 122, the main control unit 125 performs an authentication procedure to judge if the user is a subscriber or not based on data for identifying users included in the content request signal S104a, and when it judges it to be a subscriber, outputs the content request signal S104a to the cellular transmitting unit 124.

Also, when a key data request signal S104b is input from the cellular receiving unit 122, the main control unit 125 performs an authentication procedure to judge if the user is a subscriber or not based on data for identifying users included in the key data request signal S104b, and when it judges it to be a subscriber, reads the key data S102b requested by the key data request signal S104b from the memory 123 and outputs it to the cellular transmitting unit 124. The main control unit 125 performs charging processing in accordance with need, for example, after outputting the key data S102b.

Note that in the charging processing, for example, bidirectional communication is performed by using the cellular network 5 with the terminal 4 for a question and answer procedure as to payment methods etc.

Also, when a re-transmit instruction signal output from the main control unit 148 of the terminal 104 is input, the main control unit 125 outputs the re-transmit instruction signal to the main control unit 134 of the broadcast base station 103 via the cellular network 5.

Also, the main control unit 125 specifies a frequently demanded content signal, that is, a popular content signal, based on the content request signal S104a and outputs a broadcast instruction signal S102c for instructing broadcast of the specified content signal to the cellular transmitting unit 124. The broadcast instruction signal S102c is transmitted from the cellular transmitting unit 124 to the broadcast base station 103 via the cellular network 5.

[Broadcast Base Station 103]

As shown in FIG. 5, the broadcast base station 103 comprises a memory 131, an encrypting unit 132, a transmitting unit 133, a main control unit 134, and a cellular receiving unit 135.

The memory 131 stores a content signal to be transmitted via the broadcast network 6.

The encrypting unit 132 encrypts the content signals S131a and S131b read from the memory 131 and outputs the encrypted content signals S103a and S103b to the transmitting unit 133 under the control of the main control unit 134.

The cellular receiving unit 135 outputs the content request signal S104a and broadcast instruction signal S102c received from the cellular base station 102 via the cellular network 5.

The main control unit 134 controls the overall processing of the broadcast base station 103.

When the content request signal S104a is input, the main control unit 134 reads the content signal requested by the content request signal S104a from the memory 131 and outputs it to the encrypting unit 132 as a content signal S131a.

Further, the main control unit 134 reads the content signal of a program for which it is predicted many subscribers will input a content request signal S104a from the memory 131 in advance and outputs it to the encrypting unit 132 as a content signal S131b.

Also, when the broadcast instruction signal S102c is input from the cellular base station 102, the main control unit 134 reads the content signal indicated by the broadcast instruction signal S102c from the memory 131 and outputs it to the encrypting unit 132 as a content signal S131b.

Further, when a re-transmit instruction signal output from the main control unit 125 is input, the main control unit 134 reads the content signal indicated by the re-transmit instruction signal from the encrypting unit 132 and outputs it to the transmitting unit 133.

The transmitting unit 133 transmits the encrypted content signals S103a and S103b input from the encrypting unit 132 to the terminal 104 via the broadcast network 6.

Figure 6:
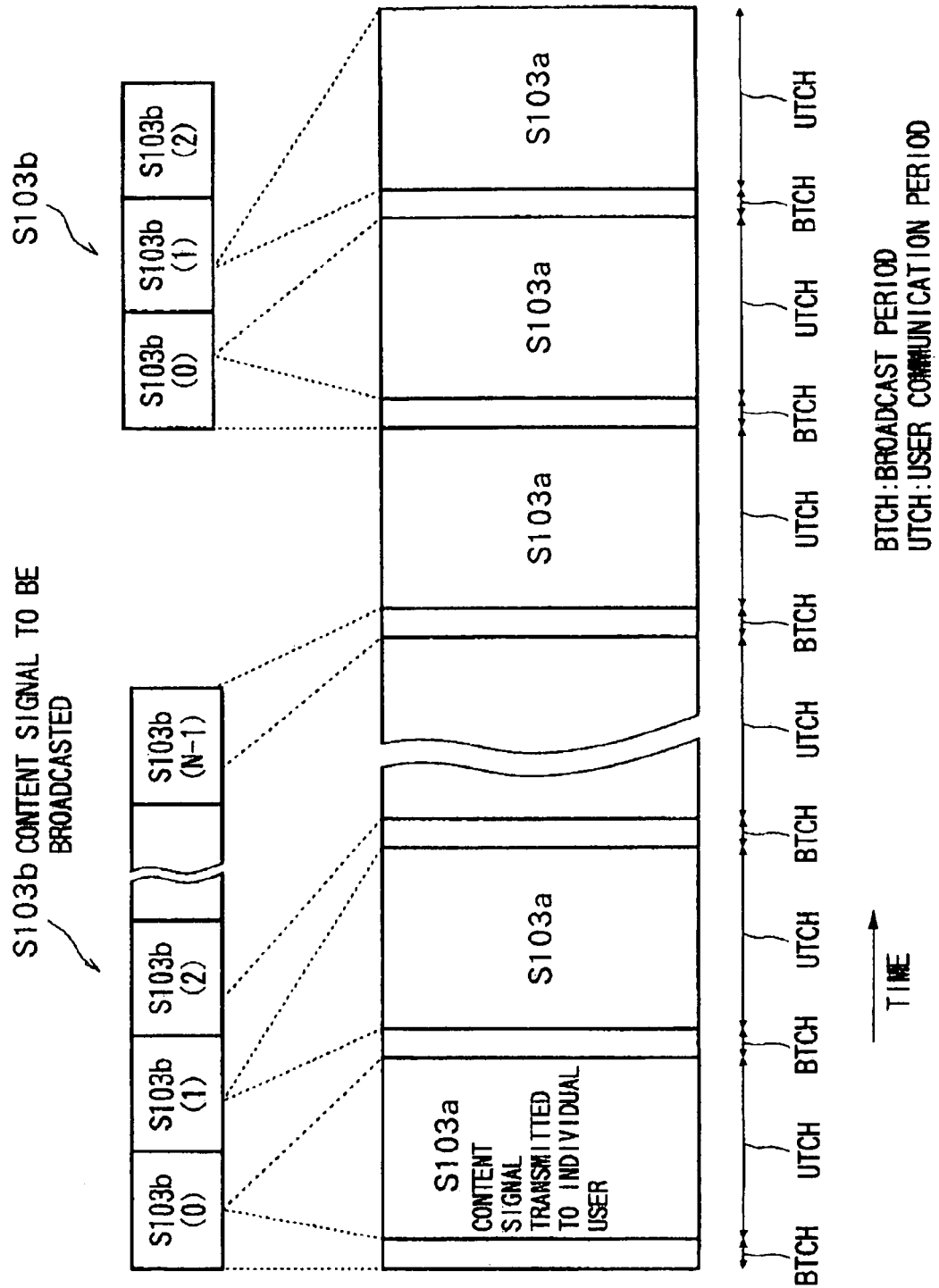
FIG. 6 is a view for explaining a transmission form of a content signal in the communication system shown in FIG. 5.

The transmitting unit 133 uses the same channel for the broadcasting by dividing the content signal S103b to broadcast periods BTCH determined cyclically based on a predetermined timing as shown in FIG. 6 and transmits the content signal S103a during other periods as user communication periods UTCH. Namely, the transmitting unit 133 alternately transmits the content signal S103a and S103b using the same channel by dividing it by time.

Also, in the example shown in FIG. 6, the content signal S103b is sent repeatedly in units of content signal S103b(0) to (N−1).

[Terminal 104]

As shown in FIG. 5, the terminal 104 comprises a receiving unit 141, a cellular receiving unit 142, a memory 142, a cellular transmitting unit 144, a cellular control unit 145, a decrypting unit 146, a reproduction unit 47, a main control unit 148, and an operation unit 49.

Note that the reproduction unit 47 and the operation unit 49 are the same as the reproduction unit 47 and the operation unit 49 shown in FIG. 1 explained in the first embodiment.

The receiving unit 141 receives the encrypted content signal S103a transmitted from the broadcast base station 103 via the broadcast network 6 during the user communication periods (UTCH) and outputs the part of the received content signal S103a received at the timing instructed under the control of the main control unit 148 to the memory 143.

Specifically, the receiving unit 141 outputs only the content signal S103a in accordance with the content request signal S104a transmitted by the main control unit 148 to the memory 143.

Further, the receiving unit 141 receives the encrypted content signal S103b broadcasted from the broadcast base station 103 via the broadcast network 6 and outputs the received content signal S103b to the memory 143.

Note that in the present embodiment, since the same content signal S103b is received a plurality of times at predetermined time intervals by the receiving unit 141, the receiving unit 141 does not output to the memory 143 the same content signal S103b as the content signal S013b stored in the memory 143 without error the previous time.

The memory 143 stores the encrypted content signals S103a and S103b input from the broadcast receiving unit 141.

The cellular receiving unit 142 outputs key data S102b received from the cellular base station 102 via the cellular network 5 to the decrypting unit 46 under the control of the main control unit 148.

The cellular transmission portion 144 transmits to the cellular base station 102 the content request signal S104a input from the main control portion 48 and the key data request signal S104b via the cellular network 5.

The cellular control unit 145 controls the overall cellular communication by the cellular receiving unit 142 and the cellular transmitting unit 144. Specifically, the cellular control unit 145 performs wireless management such as zone selection and wireless line setting, mobile management such as position registration and authentication, and call control such as signal transmission and signal reception in the same way as in the above cellular control unit 21.

The decrypting unit 146 decrypts the content signals S103a and S103b read from the memory 143 by using the key data S102b input from the cellular receiving unit 142 to generate a content signal S146 and outputs the content signal S146 to the reproduction unit 47 under the control of the main control unit 148.

The reproduction unit 47 outputs audio and video in accordance with the content signal S146 input from the decrypting unit 146 respectively to a display and a speaker.

The main control unit 148 totally the overall processing of the terminal 104.

The processing carried out in the main control unit 148 in accordance with the content play instruction signal S49 is basically the same as the processing of the main control unit 48 of the first embodiment explained with reference to FIG. 4.

Further, the main control unit 148 detects a transfer error of the content signal S103a received by the receiving unit 141 and, when the transfer error is uncorrectable, outputs a re-transmit instruction signal for instructing re-transmission of a predetermined size of a block including the uncorrectable unit to the cellular transmitting unit 144.

Also, the main control unit 148 detects transfer error of the content signal S103b received by the receiving unit 141 and, when the transfer error is uncorrectable, rewrites the unit including the transfer error stored in the memory 143 by the received content signal S103b without transfer error when the same content signal S103b is received.

The overall operation of the communication system 101 shown in FIG. 5 will be explained below.

First, in the broadcast base station 103, a content signal S131b for which it is predicted many users will wish to view is read from the memory 131 and output to the encrypting unit 132 under the control of the main control unit 134.

Then, the content signal S131b is encrypted in the encrypting unit 132 to generate a content signal S103b. The content signal S103b is broadcasted from the transmitting unit 133 to the terminal 104 via the broadcast network 6 during the broadcast period BTCH shown in FIG. 6.

The content signal S103b is received by the receiving unit 141 of the terminal 104 and stored in the memory 143.

Then, the following operation is performed between the cellular base station 102 and the terminal 104 based on a content play instruction signal S49 generated in accordance with the operation of the operation unit by a user.

Below, the operation performed between the cellular base station 102 and the terminal 104 will be separately explained for cases of whether or not the content signal instructed to be played by the content play instruction signal S49 is stored in the memory 143.

[First Example of Operation]

In the first example of operation, an operation when a content signal instructed to be played by a content play instruction signal S49 is stored in the memory 43 will be explained.

The operation unit 49 is operated by a user and a content play instruction signal S49 specifying the content the user wishes to view (be played) is output from the operation unit 49 to the main control unit 148.

Then, the content signal of the content specified by the content play instruction signal S49 is judged to be stored in the memory 143 in the main control unit 148 (Steps S1 and S2 shown in FIG. 4).

Then, a key data request signal S104b for decrypting the content signal instructed to be played by the content play instruction signal S49 is transmitted from the main control unit 148 to the cellular transmitting unit 144 (Step S3 shown in FIG. 4), and the key data request signal S104b is received by the cellular receiving unit 122 of the cellular base station 102 via the cellular network 5.

The key data request signal S104b received by the cellular receiving unit is output to the main control unit 125, the user authentication procedure is performed in the main control unit 125, and when it is judged that the user is a subscriber, the key data S102b specified by the key data request signal S104b is read from the memory 123 to the cellular transmitting unit 124.

Then, the key data S102b is transmitted from the cellular transmitting unit 124 to the terminal 104 via the cellular network 5 and received by the cellular receiving unit 142 of the terminal 104.

The key data S102b received by the cellular receiving unit 142 is output to the decrypting unit 146.

Further, the content signal specified by the content play instruction signal S49 is read from the memory 143 and output to the decrypting unit 146 by the main control unit 148 (Step S4 shown in FIG. 4).

Then, in the decrypting unit 146, the content signal read from the memory 143 is decrypted by using the key data S102b and the decrypted content signal S147 is output to the reproduction unit 47.

In the reproduction unit 47, audio and video in accordance with the content signal S146 is played and output.

[Second Example of Operation]

In the second example of operation, a case where the content signal instructed to be played by the content play instruction signal S49 is not stored in the memory 143 will be explained.

The operation unit 49 of the terminal 4 is operated by a user and a content play instruction signal S49 instructing the content the user wishes to view (be played) is output from the operation unit 49 to the main control unit 148.

Then, in the main control unit 148, it is judged that the content signal instructed to be played by the content play instruction signal S49 is not stored in the memory 143 (Steps S1 and S2 shown in FIG. 4).

Then, a content request signal S104a for requesting the content signal instructed to be played by the content play instruction signal S49 is transmitted from the main control unit 148 to the cellular transmitting unit 144 (Step S5 shown in FIG. 4), and the content request signal S104a is received by the cellular receiving unit 122 of the cellular base station 102 via the cellular network 5.

The content request signal S104a received by the cellular receiving unit 122 is output to the main control unit 125, the user authentication procedure is performed by the main control unit 125, and when it is judged that the user is a subscriber, the content request signal S104a is output to the cellular transmitting unit 124. The content request signal S104a is transmitted from the cellular transmitting unit 124 to the broadcast base station 103 via the cellular network 5.

Also, in the main control unit 125, when it is judged that the user is a subscriber, the key data S102b is read from the memory 123 and output to the cellular transmitting unit 124. The key data S102b is transmitted from the cellular transmitting unit 124 to the terminal 104 via the cellular network 5, received by the cellular receiving unit 142, and output to the decrypting unit 146.

On the other hand, the content request signal S104a is received by the cellular receiving unit 135 of the broadcast base station 103 and then output to the main control unit 134, and the content signal requested by the content request signal SS104a is read from the memory 131 to the encrypting unit 132 by the main control unit 134.

The content signal S131a is encrypted by the encrypting unit 132 to generate a content signal S103a, and the content signal S103a is output to the transmitting unit 133.

The content signal S103a is transmitted from the transmitting unit 133 to the terminal 104 during the user communication period UTCH shown in FIG. 6 via the broadcast network 6 and received by the receiving unit 141 of the terminal 104.

The content signal S103a received by the receiving unit 141 is stored in the memory 143, read out, and output to the decrypting unit 146 under the control of the main control unit 148.

Then in the decrypting unit 146, the key data S102b Input from the cellular receiving unit 142 is used to decrypt the content signal S103a read from the memory 143 and a content signal S146 is generated.

In the reproduction unit 47, audio and video in accordance with the content signal S146 is played and output.

As explained above, according to the communication system 101, even when transmission of a content signal in accordance with a content request signal and broadcasting of a content signal predicted to be popular are performed by using the same channel, the same efficiency can be obtained as in the communication system of the above first embodiment.

In this way, by transmitting a content signal S103a in accordance with the content request signal S104a from the user not via the cellular network 5 but via the broadcast network 6, the communication load on the cellular network can be reduced and it becomes possible to appropriately handle the case where subscribers largely increase.

Also, as shown in FIG. 6, since the content signal S103b is repeatedly transmitted, even when a transfer error occurs in the content signal S103b, it is possible to prevent the situation of the cellular base station 102 receiving a large number of re-transmit request signals from a large number of terminals 104.

Third Embodiment

In the present embodiment, a communication system wherein a function of broadcasting a content signal by using a communication satellite (CS) is added to the communication system 101 of the above second embodiment will be explained.

FIG. 7 is a view of the configuration of a communication system 201 of the present invention, and FIG. 8 is a view of the inside configurations of the blocks shown in FIG. 7.

As shown in FIG. 7, the communication system 201 comprises a cellular base station 102, a broadcast base station 103a, a terminal 104a, a communication satellite 250, and a set top box 251.

Here, bidirectional cellular communication using the network 5 is performed between the broadcast base station 103a and terminal 104a.

Note that, while not illustrated in FIG. 7, there may be any number of cellular base stations 102, broadcast base stations 103, terminals 104a, and communication satellites 250. Normally, a plurality of terminals 104a are provided for one cellular base station 102 and one broadcast base station 103a.

The set top box 251 is arranged close to the terminal 104a and outputs a content signal from the communication satellite 250 received by an antenna to the terminal 104a.

The internal configurations of the components shown in FIG. 7 will be explained in detail below with reference to FIG. 8.

[Cellular Base Station 102]

As shown in FIG. 8, the cellular base station 102 is the same as the cellular base station 102 shown in FIG. 5.

[Broadcast Base Station 103a]

As shown in FIG. 8, the broadcast base station 103a comprises a memory 131, an encrypting unit 132, a transmitting unit 133, a main control unit 134a, a cellular receiving unit 135, and a CS transmitting unit 270.

Here, the memory 131, encrypting unit 132, transmitting unit 133, and cellular receiving unit 135 are the same as the components having the same reference numerals shown in FIG. 5.

Namely, the broadcast base station 103a is configured as the broadcast base station 103 shown in FIG. 5 added with the CS transmitting unit 270 and provided with the main control unit 134a instead of the main control unit 134.

The main control unit 134a is the same as the main control unit 134 shown in FIG. 5 explained in the second embodiment except for the following point.

Namely, the main control unit 134a outputs a content signal S103a (a content signal transmitted in accordance with an access request signal S104a from a user) and outputs the content signal S103b (a content signal to be broadcasted) to the CS transmitting unit 270.

As explained above, the main control unit 134a transmits the content signal S103a from the transmitting unit 133 to the terminal 104a via the broadcast network 6 using a digital television broadcast of a ground wave and controls the broadcast of the content signal S103b from the CS transmitting unit 270 to the terminal 104a via the communication satellite network 260 using a communication satellite 250.

Also, the CS transmitting unit 270 transmits the content signal S103b input from the encrypting unit 132 to the communication satellite 250 via the communication satellite network 260.

[Communication Satellite 250]

The communication satellite 250 comprises a CS receiving unit 271 and a CS transmitting unit 272.

The CS receiving unit 271 amplifies and filters the content signal S103b received from the broadcast base station 103a and outputs it to the CS transmitting unit 272.

The CS transmitting unit 272 converts the content signal S103 input from the CS receiving unit 271 to a transmission frequency and transmits the same.

[Set Top Box 251]

The set top box 251 comprises a CS receiving unit 273.

The CS receiving unit 273 outputs to the terminal 104a the content signal S103b received from the communication satellite 250 after performing predetermined processing.

[Terminal 104a]

As shown in FIG. 8, the terminal 104a comprises a receiving unit 141, a cellular receiving unit 142, a memory 143, a cellular transmitting unit 144, a cellular control unit 145, a decrypting unit 146, a reproduction unit 47, a main control unit 148a, and an operation unit 49.

Here, the receiving unit 141, cellular receiving unit 142, memory 143, cellular transmitting unit 144, cellular control unit 145, decrypting unit 146, reproduction unit 47, and operation unit 49 are the same as the components having the same reference numerals shown in FIG. 5 of the above first embodiment.

Also, the main control unit 148a is the same as the main control unit 148 of the above first embodiment except for the following point.

Namely, the main control unit 148a stores in the memory 143 a content signal S103a received by the receiving unit 141 and stores in the memory 143 the content signal input from the set top box 251.

The operation of the communication system 201 is the same as that of the communication system 101 of the above second embodiment except that the content signal S103a is transmitted to the terminal 4 via the broadcast network 6 and that the content signal S103b is broadcasted to the terminal 4 via the communication satellite network 260.

As explained above, according to the communication system 201, the content signal S103b is broadcasted via the communication network 260. Therefore, the content signal S103b received by a large number of terminals can be transmitted at a high bit rate (high speed) and at a low error rate (high reliability). Also, in the communication network 260, since a broad service area can be secured, the content signal S103b can be broadcasted to a large number of terminals 4 arranged in a wide area.

Further, according to the communication system 201, the content signal S103a is transmitted via the broadcast network 6 having a cell structure using a ground wave by receiving the content request signal S104a from the respective users. Therefore, the content signal S103a can be transmitted by specifying a cell and it becomes possible to individually respond to content request signals from a large number of users by establishing a large number of communication lines (channels).

The present invention is not limited by the above embodiments.

For example, the present invention may use a bidirectional communication network such as wired networks like ISDN and satellite telephone line networks instead of the cellular network 5 in the above embodiment. Also, the broadcast network 6 may use communication lines using, for example, communication lines of cable television and multimedia access control (MMAC) systems other than ground waves.

As explained above, according to the communication apparatus of the embodiments, when an already broadcasted content signal is specified, since it is sufficient to read the broadcasted content signal from the memory means, it is possible to reduce the frequency of transmission of a content request signal and the frequency of individually reception of a content signal in accordance with the content request signal and therefore the amount of communication can be reduced.

Also, according to a communication apparatus of the embodiments, in addition to transmitting the content signal in accordance with the content request signal from the second transmission means, by broadcasting a predetermined content signal from the first transmission means, the frequency of receiving a content request signal for requesting the broadcasted content signal can be reduced. Further, the frequency of individually transmitting the content signal to other communication apparatuses can be reduced. As a result, the amount of communication can be made smaller.

Also, according to the communication system and method of the present invention, the amount of communication between a first communication apparatus and a second communication apparatus can be made smaller.

While the invention has been described with reference to specific embodiment chosen for purpose of illustration, it should be apparent that numerous modifications could be made thereto by those skilled in the art without departing from the basic concept and scope of the invention.

What is claimed is:

1. A communication apparatus for receiving a content signal and storing the received content signal, comprising:
   a reception means for receiving a broadcasted content signal;
   a memory means for storing said broadcasted content signal received by said reception means;
   a control means for judging whether or not a specified content signal is stored in said memory means and, when it is judged that it is not stored, generating a content request signal for requesting said specified content signal; and
   a transmission means for transmitting said generated content request signal:
   said reception means further receiving a content signal response to said transmitted content request signal.

2. A communication apparatus as set forth in claim 1, further comprising:
   an output means for performing at least one of a video output and an audio output in accordance with the content signal;
   wherein said control means reads said specified content signal from said memory means and outputs it to said output means when it is judged that said specified content signal is stored in said memory means.

3. A communication apparatus as set forth in claim 1, further comprising:
   an output means for performing at least one of a video output and an audio output in accordance with a content signal;
   wherein:
   said control means outputs said specified content signal received by said reception means in accordance with said content request signal to said output means when it is judged that said specified content signal is not stored in said memory means.

4. A communication apparatus as set forth in claim 1, further comprising:
   a decryption means for decrypting said content signal read from said memory means by using key data when said broadcasted content signal is encrypted;
   wherein:
   said control means generates a key data request signal for requesting said key data when it is judged that said specified content signal is stored in said memory means;
   said transmission means transmits said key data request signal; and
   said reception means outputs said key data received in accordance with said key data request signal to said decryption means.

5. A communication apparatus as set forth in claim 1, wherein:
   said control means judges whether or not an uncorrectable error exists in said broadcasted content signal received by said reception means and, when it is judged that an uncorrectable error exists, generates a re-transmit instruction signal for instructing to re-transmit the broadcasted content signal; and
   said transmission means transmits said re-transmit instruction signal.

6. A communication apparatus as set forth in claim 1, wherein said reception means comprises:
   a first reception means for receiving said broadcasted content signal; and
   a second reception means for receiving a content signal in accordance with said transmitted content request signal via a different communication line from that in said first communication means.

7. A communication apparatus as set forth in claim 6, wherein:
   said transmission means uses a communication line individually established with another party to transmit said content request signal to said another party; and
   said second reception means uses a communication line individually established with said other party to receive a content signal from said other party in accordance with said content request signal.

8. A communication apparatus as set forth in claim 7, wherein said transmission means receives said content request signal via a communication line capable of bidirectional communication the same as the communication line for transmitting said content signal transmitted by said second transmission means.

9. A communication apparatus as set forth in claim 6, wherein:
said transmission means and said second reception means perform communication relating to at least one of procedures of authentication and charging with said other party.

10. A communication apparatus as set forth in claim 1, wherein
said reception means receives said broadcasted content signal and a content signal in accordance with said transmitted content request signal from the same communication lines by time division.

11. A communication apparatus as set forth in claim 6, wherein said first reception means receives said content signal via a communication medium having a larger communication capacity than a communication medium for transmitting said content signal received by said second reception means.

12. A communication apparatus as set forth in claim 1, wherein said reception means and said transmission means perform transmission of said content request signal and reception of a content signal in accordance with said content request signal by wireless communication capable of bi-directional communication by a cell mode.

13. A communication apparatus as set forth in claim 1, wherein said reception means receives said broadcasted content signal by using a ground wave or a satellite.

14. A communication apparatus as set forth in claim 6, wherein said first reception means receives said broadcasted content signal by using a satellite, and said second reception means receives a content signal in accordance with said content request signal by using a ground wave.

15. A method of communication for receiving a content signal, comprising:
a broadcast reception process for receiving a broadcasted content signal;
a storing process for storing said broadcasted content signal received by said broadcast reception process;
a control process for judging whether or not a specified content signal is stored and generating a content request signal for requesting said specified content signal when it is judged that it is not stored;
a transmission process for transmitting said generated content request signal; and
an individual reception process for also receiving a content signal in accordance with said transmitted content request signal.

16. A communication apparatus capable of communicating with a plurality of communication apparatuses, comprising:
a reception means for receiving a content request signal from one or more of said plurality of communication apparatuses;
a memory means for storing a content signal;
a transmission means for broadcasting a content signal to one or more of said plurality of communication apparatuses and transmitting the content signal to communication apparatuses which transmitted said content request signal; and a control means for reading a predetermined content signal from said memory means, broadcasting the read content signal from said transmission means to one or more of said plurality of transmission apparatuses, reading a content signal requested by the content request signal from said memory means when said reception means receives said content request signal, and transmitting the read content signal to said communication apparatuses which transmitted said content request signal.

17. A communication apparatus as set forth in claim 16, further comprising an encrypting means for encrypting a content signal;
wherein said control means encrypts said predetermined content signal read from said memory means and makes said first transmission means broadcasts the encrypted content signal to said communication apparatuses which transmitted said content request signal.

18. A communication apparatus as set forth in claim 16, wherein:
said reception means further receives a key data request signal for requesting key data via communication lines individually established with said communication apparatuses;
said memory means further stores the key data for decrypting a content signal encrypted by said encryption means; and
said control means reads the key data requested by said key data request signal received by said reception means from said memory means and transmits the read key data from said transmission means to said communication apparatuses which transmitted said key data request signal.

19. A communication apparatus as set forth in claim 16, wherein said transmission means comprises:
a first transmission means for broadcasting a content signal to said plurality of communication apparatuses; and
a second transmission means for transmitting a content signal to said communication apparatuses which transmitted the content request signal via a different communication line from that in said first communication means.

20. A communication apparatus as set forth in claim 19, wherein:
said reception means receives said content request signal from said content request signal from said communication apparatuses via communication lines individually established with said communication apparatuses; and
said second transmission means transmits said content signal by individually establishing communication lines with said communication apparatuses which transmitted said content request signal.

21. A communication apparatus as set forth in claim 20, wherein said reception means and said second transmission means perform communication relating to at least one procedure of authentication and charging with said communication apparatuses.

22. A communication apparatus as set forth in claim 19, wherein said reception means receives said content request signal via a communication line capable of bi-directional communication, and wherein said communication line is the same as the communication line for transmitting said content signal transmitted by said second transmission means.

23. A communication apparatus as set forth in claim 16, wherein said transmission means transmits a content signal to be broadcasted to said plurality of communication apparatuses and a content signal based on said content request signal via the same communication lines by time division.

24. A communication apparatus as set forth in claim 19, wherein said first transmission means broadcasts said predetermined content signal via a communication medium having a larger communication capacity than a communication medium for transferring said content signal transmitted by said second transmission means.

25. A communication apparatus as set forth in claim 19, wherein said second transmission means and said reception means perform transmission of said content signal and reception of said content request signal by wireless communication capable of bi-directional communication by a cell mode.

26. A communication apparatus as set forth in claim 19, wherein said first transmission means broadcasts said predetermined content signal by using a ground wave or a satellite.

27. A communication apparatus as set forth in claim 19, wherein:
said first transmission means broadcasts said predetermined content signal by using a satellite; and
said second transmission means transmits a content signal in accordance with said content requests signal by using a ground wave.

28. A communication apparatus as set forth in claim 16, wherein
said transmission means transmits a content signal requested by a plurality of communication apparatuses by broadcasting based on said content request signal received by said reception means.

29. A method of communication for transmitting a content signal to communication apparatuses, comprising:
a reception process for receiving a content request signal from said communication apparatuses;
a broadcast process for broadcasting a predetermined content signal to said communication apparatuses; and
an individual transmission process for transmitting a content signal requested by a content request signal to said communication apparatuses which transmitted said content request signal when said reception process receives said content request signal.

30. A communication apparatus capable of communicating with a plurality of communication apparatuses, comprising:
a reception means for receiving a content request signal from said
communication apparatuses;
a transmission means for transmitting a content signal to said communication apparatuses which transmitted said content request signal; and
a control means for generating a control signal for broadcasting a requested content signal by a broadcast device based on said content request signal and transmitting to a broadcast device.

31. A method of communication for transmitting a content signal to a plurality of communication apparatuses, comprising:
a reception process for receiving a content request signal from said communication apparatus;
a transmission process for transmitting a content signal to said communication apparatuses which transmitted said content request signal; and a control process for generating a control signal for broadcasting a requested content signal by a broadcast device based on said content request signal and transmitting to a broadcast device.

32. A communication apparatus capable of communicating with a plurality of communication apparatuses, comprising:
a reception means for receiving from a communication station a broadcast request signal requesting the broadcasting of a a content signal requested by said communication apparatuses, said broadcast request signal being generated based on a content request signal requesting a content signal from said plurality of communication apparatuses to the communication station; and
a broadcast means for broadcasting a content signal based on said broadcast request signal to said plurality of communication apparatuses.

33. A method of communication for broadcasting a content signal to a plurality of communication apparatuses, comprising:
a reception process for receiving from a communication station a broadcast request signal requesting the broadcasting of a content signal requested by said communication apparatuses, said broadcast request signal being generated based on a content request signal requesting a content from said plurality of communication apparatuses to the communication station; and
a broadcast process for broadcasting a content signal based on said broadcast request signal to said plurality of other communication apparatuses.

34. A communication system having a first communication apparatus for providing a content signal and one or more second communication apparatuses for being provided with said content signal, wherein:
said first communication apparatus, comprising:
a first reception means for receiving a content request signal from said second communication apparatus;
a first memory means for storing a content signal;
a first transmission means for broadcasting a content signal to said plurality of second communication apparatuses and transmitting a content signal to said second communication apparatus which transmitted said content request signal;
a first control means for reading a predetermined content signal from said memory means, making the read predetermined content signal be broadcasted from said transmission means to said plurality of second communication apparatuses, reading a content signal requested by the content request signal from said memory means when said reception means receives said content request signal, and making the read content signal be transmitted from said transmission means to said second communication apparatus which transmitted said content request signal; and
said second communication apparatus comprises:
a second reception means for receiving a broadcasted content signal and also a content signal in accordance with said content request signal;
a second memory means for storing said broadcasted content signal received by said reception means;
a second control means for judging whether or not a specified content signal is stored in said memory means and, when it is judged that it is not stored, generating a content request signal for requesting said specified content signal; and a second transmission means for transmitting said generated content request signal.

35. A communication system as set forth in claim 34, wherein:
said first transmission means of said first communication apparatus transmits said content signal to said second communication apparatus individually connected to communication lines among said plurality of second communication apparatuses.

36. A method of communication performed between a first communication apparatus for providing a content signal and one or more second communication apparatuses for being provided with said content signal, comprising the steps of:
broadcasting a predetermined content signal from said first communication apparatus to said one or more second communication apparatuses;
storing said broadcasted predetermined content signal in each of said second communication apparatus;
judging whether or not a specified content signal is stored in a said second communication apparatus and transmitting said content request signal requesting said specified content signal from a second communication apparatus to said first communication apparatus when it is judged that it is not stored; and
transmitting a content signal in accordance with said content request signal from said first communication apparatus to said second communication apparatus which transmitted said content request signal.

37. A method of communication as set forth in claim 36, further comprising the steps of:
encrypting and broadcasting said predetermined content signal from said first communication apparatus to each of said second communication apparatus and,
when it is judged that said specified content signal is stored in a second communication apparatus,
transmitting a key data request signal for requesting key data for decrypting said encrypted content signal from said second communication apparatus to said first communication apparatus;
transmitting key data in accordance with said key data request signal from said first communication apparatus to said second communication apparatus; and
decrypting a received encrypted content signal by using said received key data in said second communication apparatus.

38. A communication method as set forth in claim 37, wherein transmission of said key data request signal and said key data is performed via a communication line individually established between said first communication apparatus and a said second communication apparatus.

39. A communication apparatus, comprising:
a first reception means for receiving a broadcasted content signal;
a memory means for storing said broadcasted content signal received by said first reception means;
a control means for judging whether or not a specified content signal is stored in said memory means and, when it is judged that it is not stored, generating a content request signal for requesting said specified content signal;
a transmission means for transmitting said generated content request signal; and a second reception means for receiving a content signal in accordance with said transmitted content request signal by a lower bit rate compared with that of said first reception means.

\* \* \* \* \*